United States Patent

[11] 3,579,958

[72] Inventors Ronald L. Hentges
Minneapolis;
Howard R. Garrett, St. Paul, Minn.
[21] Appl. No. 850,417
[22] Filed Aug. 15, 1969
[45] Patented May 25, 1971
[73] Assignees Haskon Incorporated Warsaw;
Warsaw, Ind.

[54] MACHINE FOR FORMING, FILLING, AND
SEALING CONTAINERS
17 Claims, 24 Drawing Figs.
[52] U.S. Cl. ............................................ 53/183,
53/379, 93/44.1
[51] Int. Cl. ........................................... B65b 7/18,
B65b 43/28

[50] Field of Search ............................................ 53/29, 183,
186, 373, 375, 376; 93/44, 44.1

[56] References Cited
UNITED STATES PATENTS
| | | | |
|---|---|---|---|
| 1,991,223 | 2/1935 | Ledig et al. .................. | 53/376X |
| 2,971,636 | 2/1961 | Engleson et al. .............. | 93/44.1X |
| 3,280,531 | 10/1966 | Meyer-Jagenberg ......... | 53/183X |

Primary Examiner—Theron E. Condon
Assistant Examiner—E. F. Desmond
Attorney—Finnegan, Henderson and Farabow ABSTRACT: A machine for automatically forming, filling, and sealing tubular container blanks that continuously holds the container blanks in an open and upright position from their external vertical sides and feeds them in sequence to the machine's forming, filling, and sealing operations.

INVENTORS
RONALD L. HENTGES
HOWARD R. GARRETT

*Finnegan, Henderson & Farabow*
ATTORNEYS

INVENTORS
RONALD L. HENTGES
HOWARD R. GARRETT

*Finnegan, Henderson & Farabow*
ATTORNEYS

INVENTORS
RONALD L. HENTGES
HOWARD R. GARRETT

*Finnegan, Henderson & Farabow*

ATTORNEYS

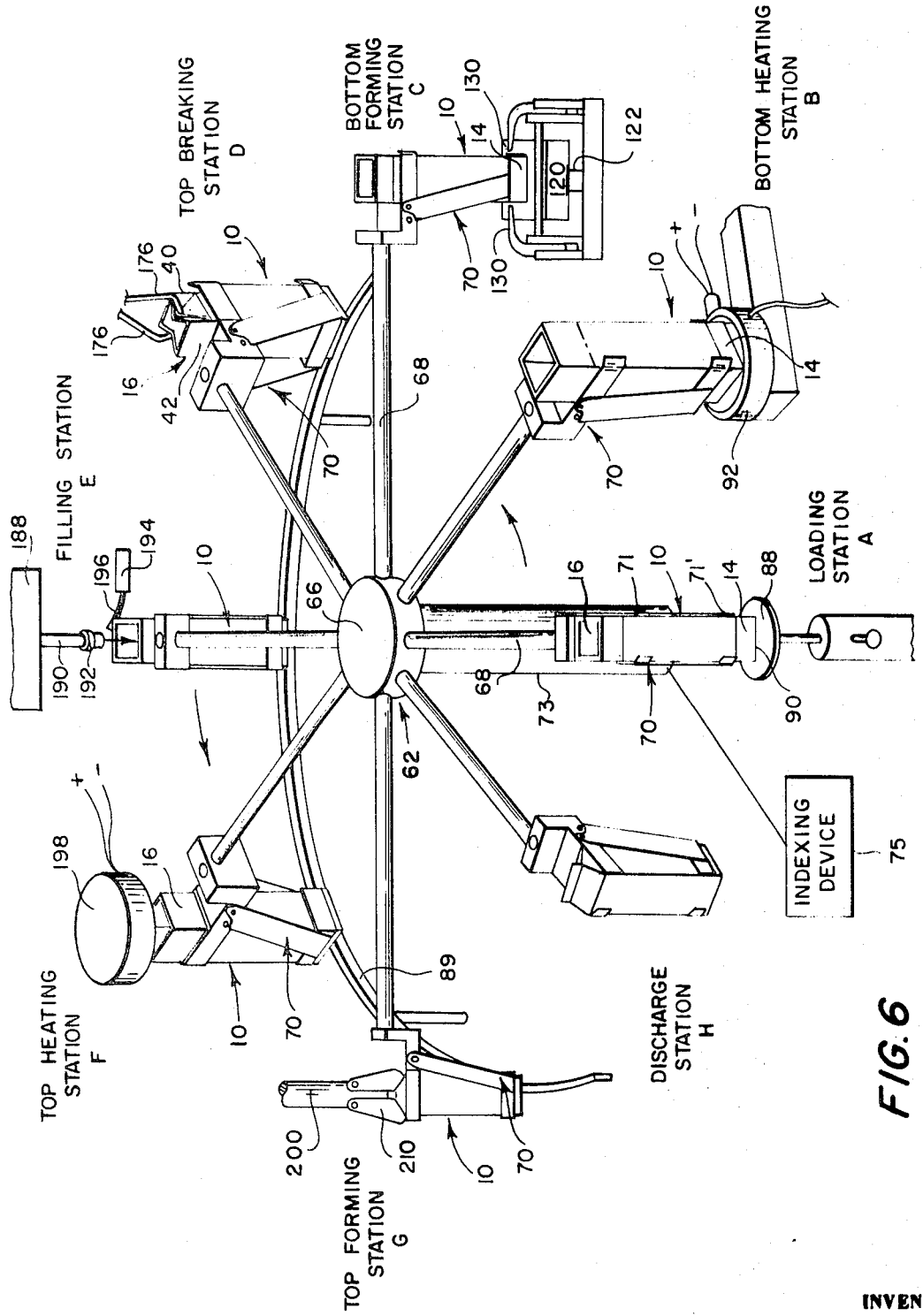

INVENTORS
RONALD L. HENTGES
HOWARD R. GARRETT

Finnegan, Henderson & Farabow
ATTORNEYS

INVENTORS
RONALD L. HENTGES
HOWARD R. GARRETT

*Finnegan, Henderson & Farabow*
ATTORNEYS

MACHINE FOR FORMING, FILLING, AND SEALING CONTAINERS

This invention relates to a machine for forming, filling, and sealing containers. More particularly, this invention relates to an improved machine for automatically and sequentially bottom-forming, filling, and top-sealing a gabled top, plastic-coated, paperboard container.

Many types of machines have been provided in the past for the packaging of plastic-coated paperboard containers. Such machines have found particular utility in the dairy industry where flattened, tubular container blanks are erected, filled, and sealed directly at the dairy for immediate consumer distribution. Both expensive high production rate machines and relatively inexpensive low production rate machines have been available to fit the individual needs of particular dairy operations.

All of these machines, however, have always required at least two separate mechanisms: One for forming and sealing the bottom of the container while the container blank is supported internally by a mandrel, and a second for filling and top-sealing the bottom-formed container. It has, therefore, been necessary in such machines to provide manual or automatic equipment for physically removing formed containers from the bottom-forming mechanism and transferring it to the filling and top-sealing mechanism. Generally, the transfer equipment must also turn the container over into an upright position after the bottom has been formed and realign it with the filling and top-sealing mechanism. Not only is valuable operating time lost in this method of operation, but the need of transfer equipment necessarily adds to the cost of the machine and also introduces a very susceptible point of machine failure, resulting in improperly formed and/or filled containers.

It is therefore desirable to provide a machine for automatically forming, filling, and sealing plastic-coated paperboard containers in a precise and accurate manner that eliminates the need for equipment to remove, transfer, and realign containers between machine operations, and that is inexpensive in cost and completely operable by a single operator. By eliminating the need for any transfer equipment, the machine's mechanical operations are simplified, its cost of fabrication is minimized, and an increase in the quality and uniformity of the finished product is realized. As such, the machine is especially useful in operations where volume requirements do not justify the cost of a larger and faster, but more expensive machine.

Accordingly, this invention provides in a machine for automatically and sequentially forming, filling, and sealing tubular container blanks; holding means for holding container blanks in an open and upright position from their external vertical sides; means defining a plurality of machine stations for forming, filling, and sealing the containers while in said position; and machine cycling means for moving the container holding means with an indexing motion for sequential registration with each of the machine stations.

Preferably, the machine includes a turret assembly mounted for rotation about a vertical axis and having a plurality of container holders for externally holding the container blanks in an open and upright position at spaced locations around the circumference of the turret assembly, the machine cycling means rotating the turret assembly with an indexing motion for sequential registration of each of the container holders with each of the machine's stations. At the various machine stations, which are preferably spaced about the axis of rotation of the turret assembly, means are provided for heat sealing the bottom closure panels of the container blanks, for filling the bottom-sealed containers, and for heat sealing the top closure panels of a filled container, the means acting sequentially on container blanks while they are gripped externally by the container holders and held in an open and upright position.

The present invention also provides a new and improved bottom forming unit for breaking, folding, and sealing unbroken bottom closure panels of a tubular container blank while the container blank is held in an open and upright position from its external vertical sides, comprising a vertically reciprocating mandrel having lower bending edges; means for reciprocating the mandrel to insert the mandrel downwardly into the open container blank and to bring the bending edges of the mandrel adjacent the fold lines of the bottom closure panels; a pair of fingers cooperating with the mandrel and acting on a first pair of bottom closure panels to break inwardly the fold lines of the bottom closure panels; a pair of roller bars acting on a second pair of panels for folding inwardly and upwardly the bottom closure panels; and a vertically reciprocating press plate to press the folded closure panels together against the mandrel and to seal them in place.

Further, the present invention provides a new and improved top forming unit for closing and sealing prebroken roof closure panels having sealing flaps of a tubular and gabled top container blank while the container blank is held in an open and upright position, comprising a pair of spaced closing guides, each guide having a slanted face adjacent one another to form a V-shaped opening therebetween; means for bringing the faces of the guides down onto the roof closure panels to bring the roof panels and their sealing flaps together to form a gabled closure top; a pair of opposed sealer jaws mounted above the guides and located adjacent opposite sides of the sealing flaps when they are together; and means for moving the jaws against the sealing flaps to seal the container closed.

It is to be understood that both the foregoing general description and the following detailed description are exemplary and explanatory but are not restrictive of the invention.

The accompanying drawings which are incorporated in and constitute a part of the specification, illustrate embodiments of the invention, and together with the description serve to explain the principles of the invention.

Figure 7:
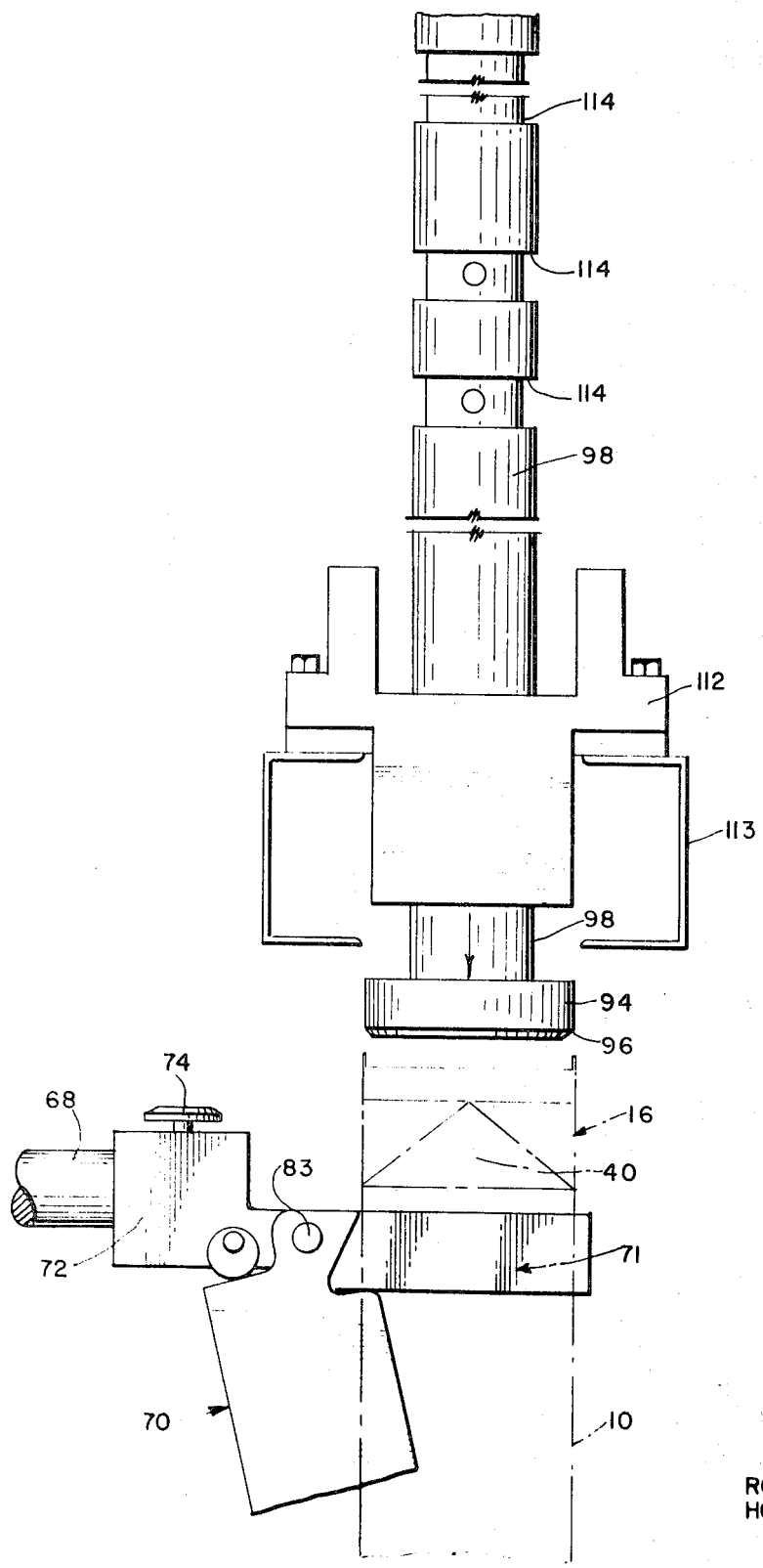
Figure 8:
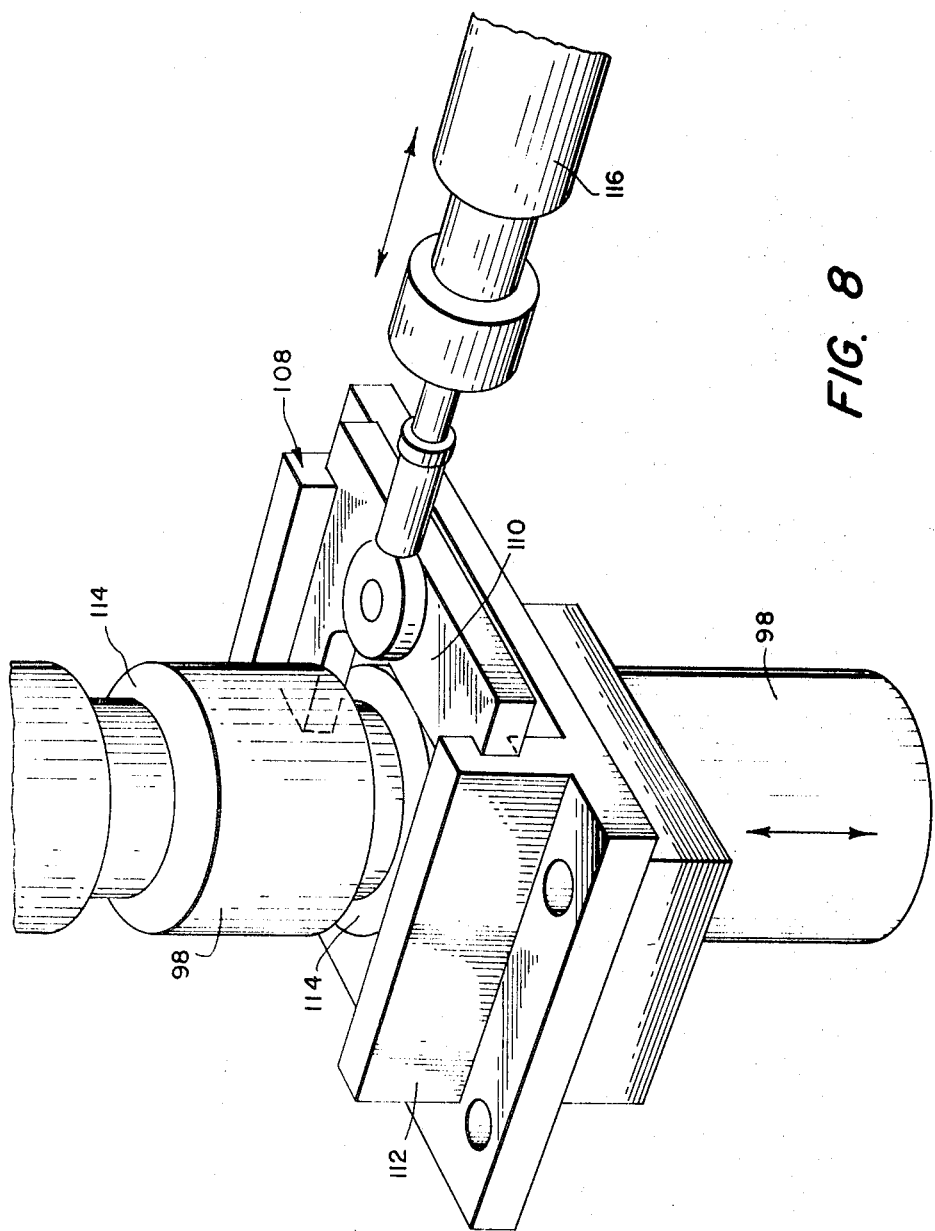
Figure 9:
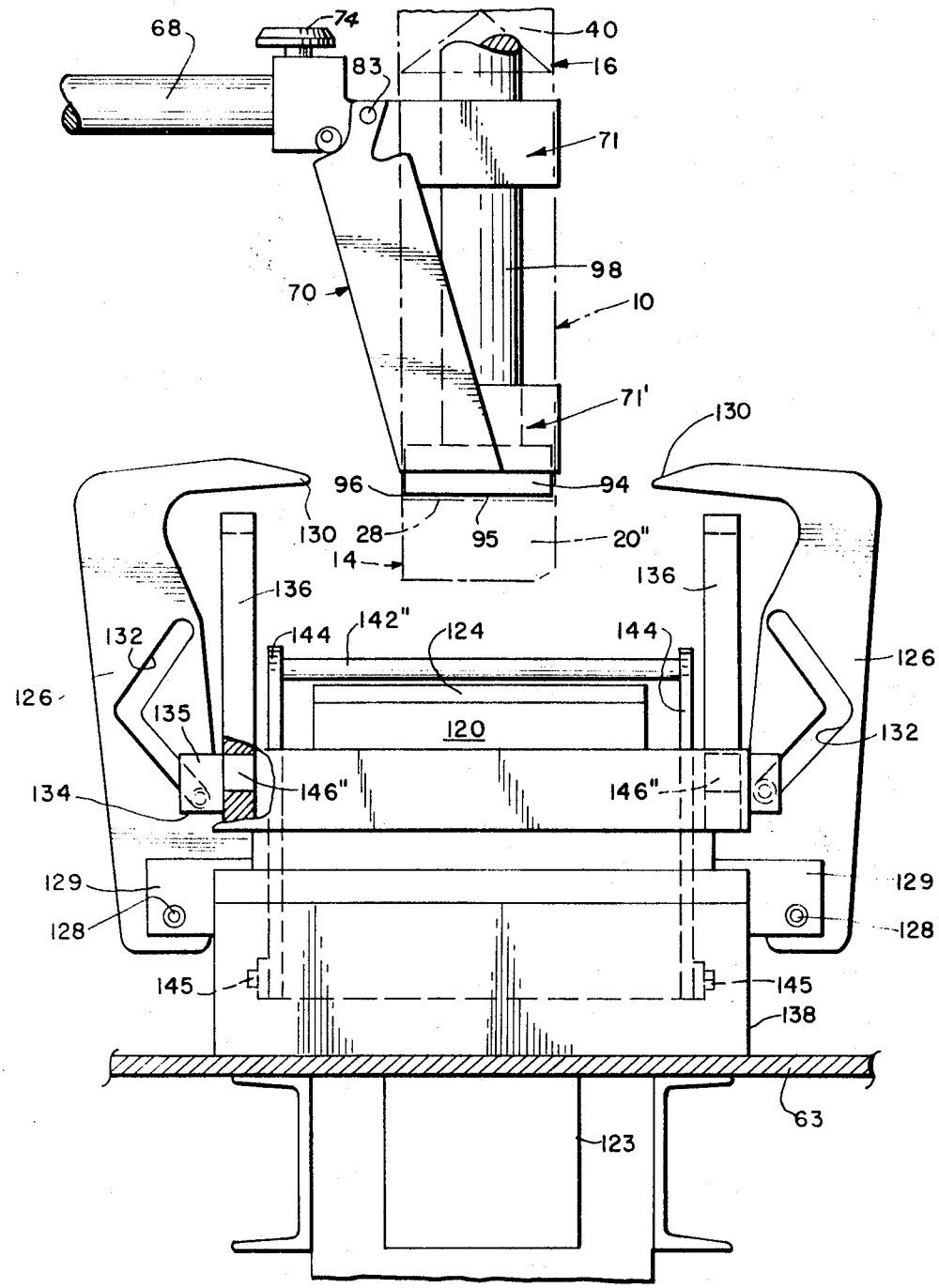
Figure 10:
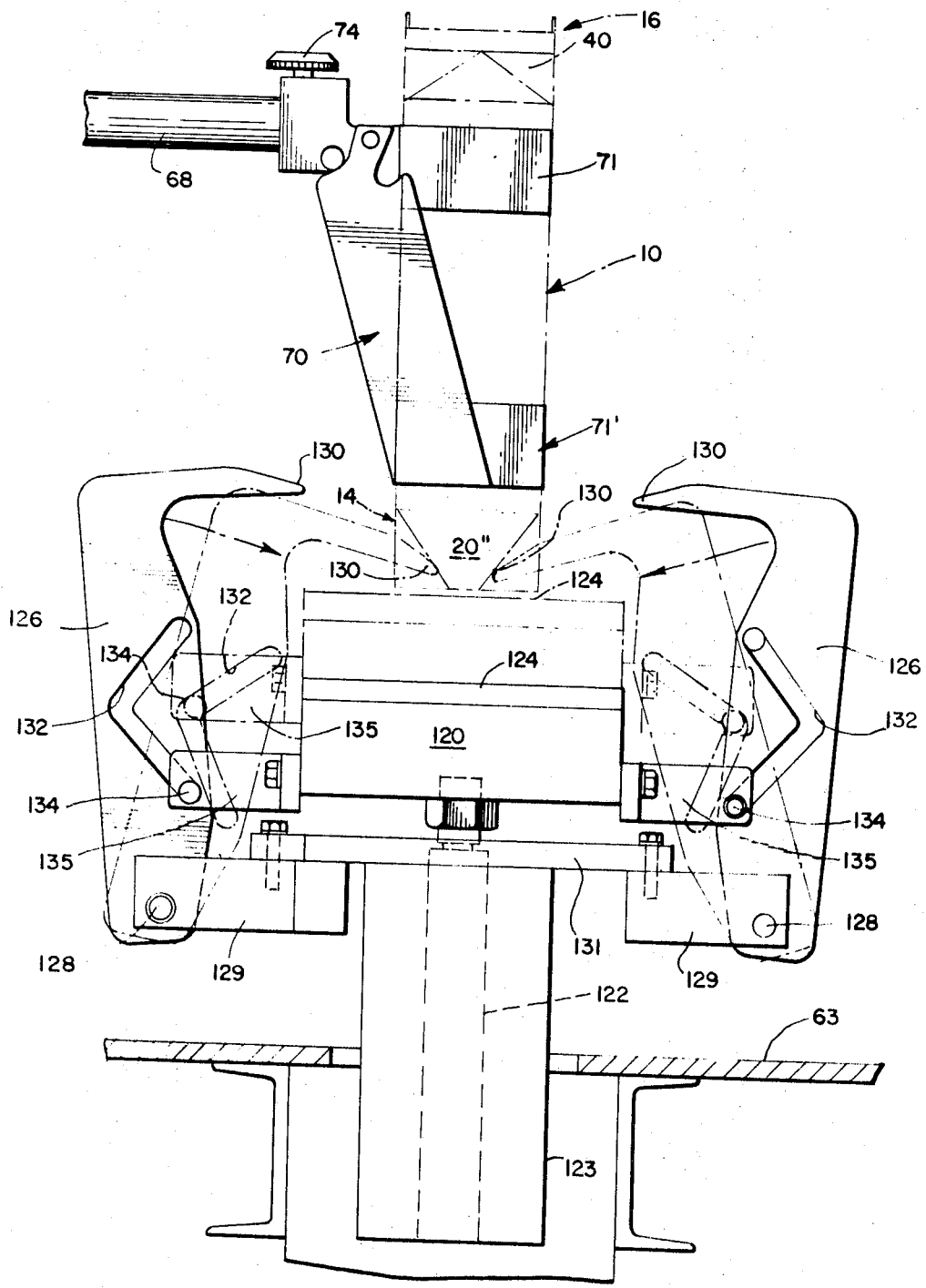
Figure 11:
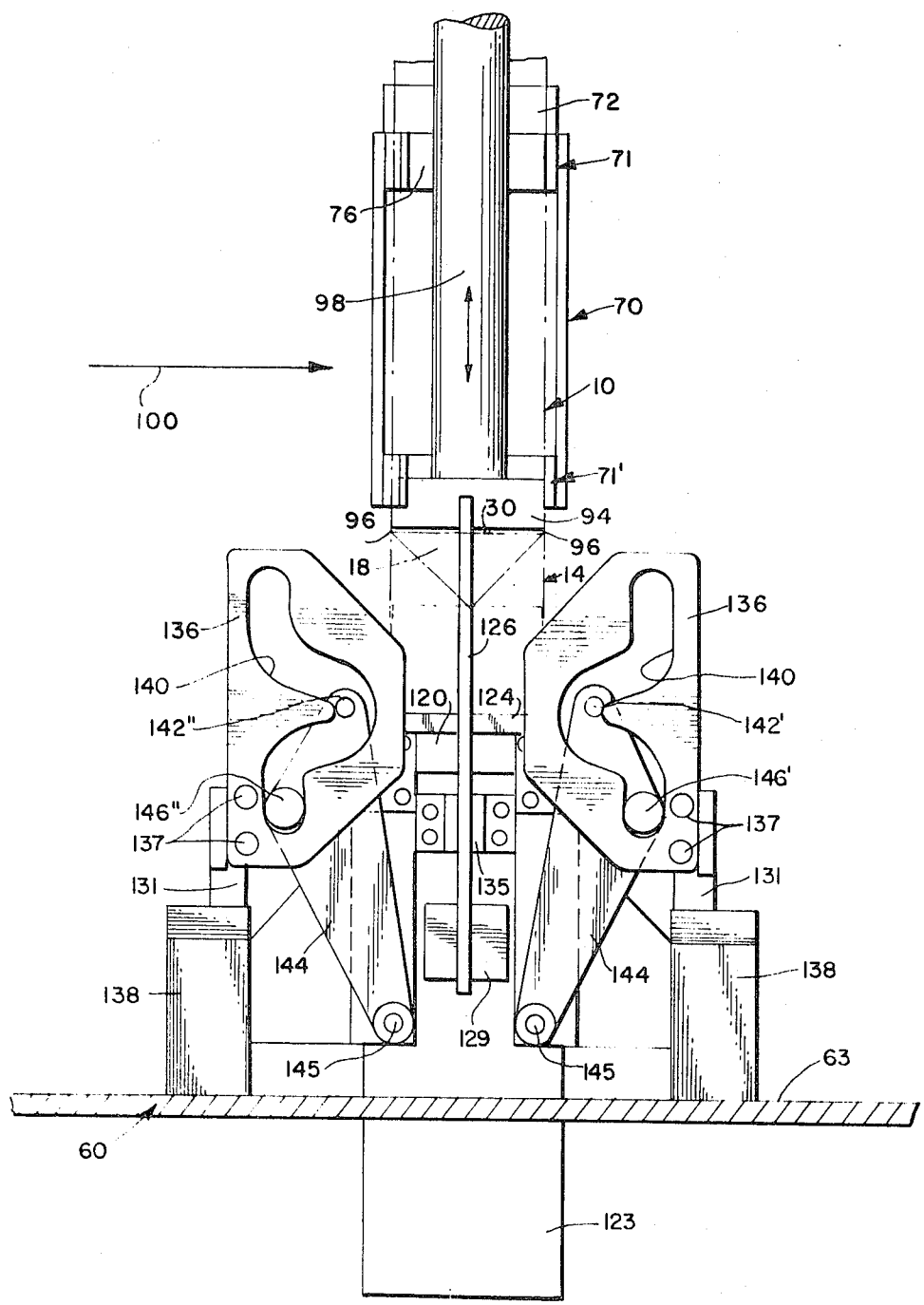
Figure 12:
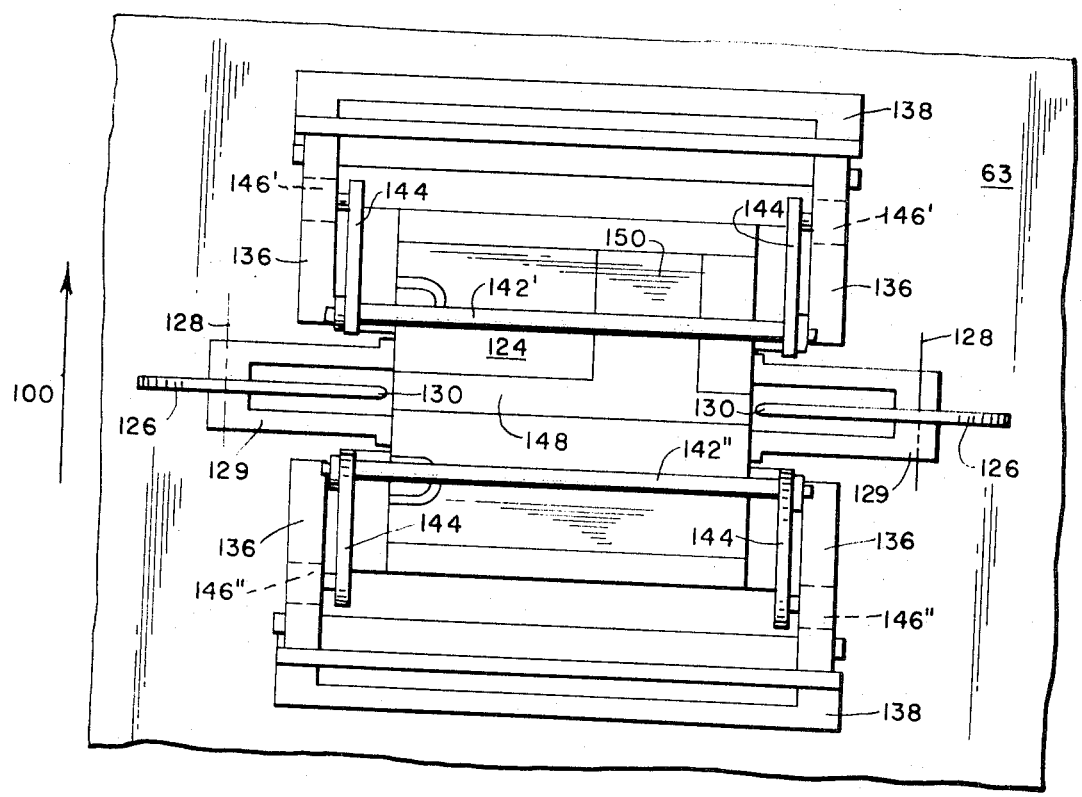
Figure 15:
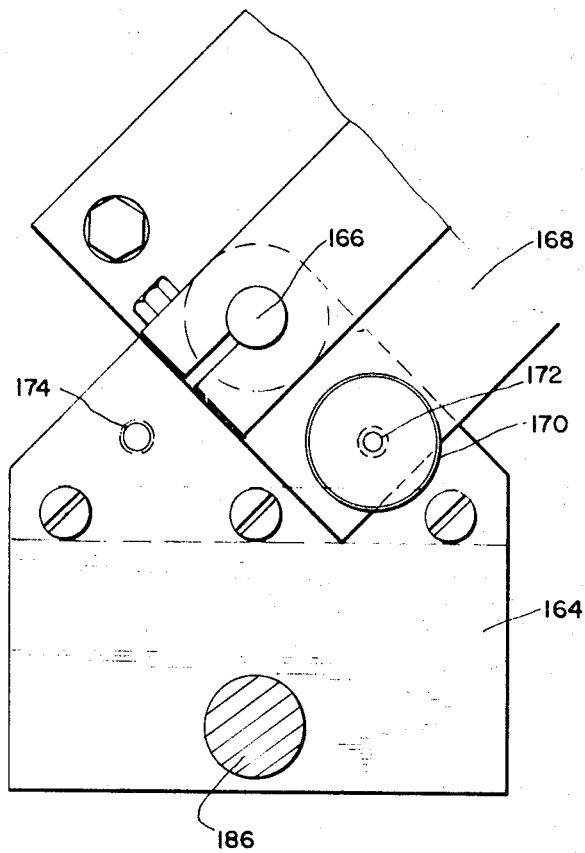
Figure 13:
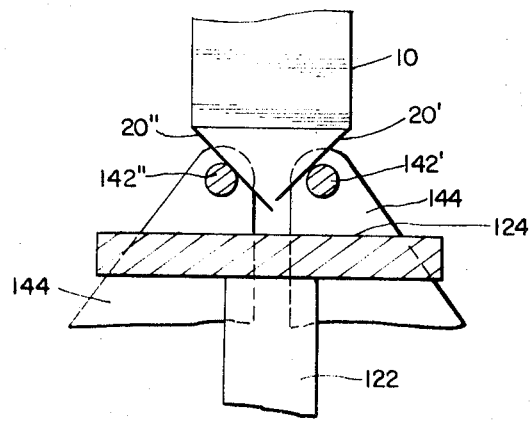
Figure 14:
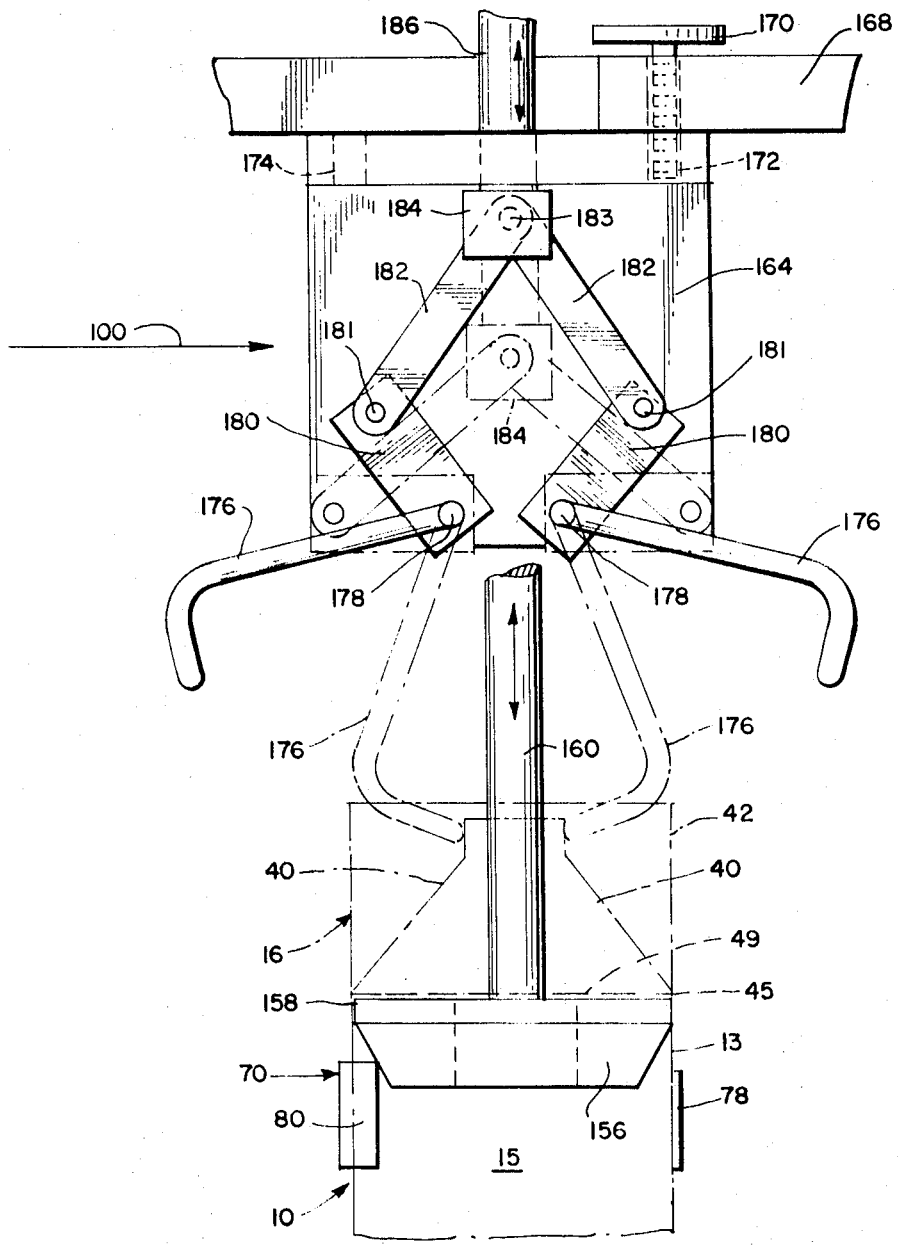
Figure 17:
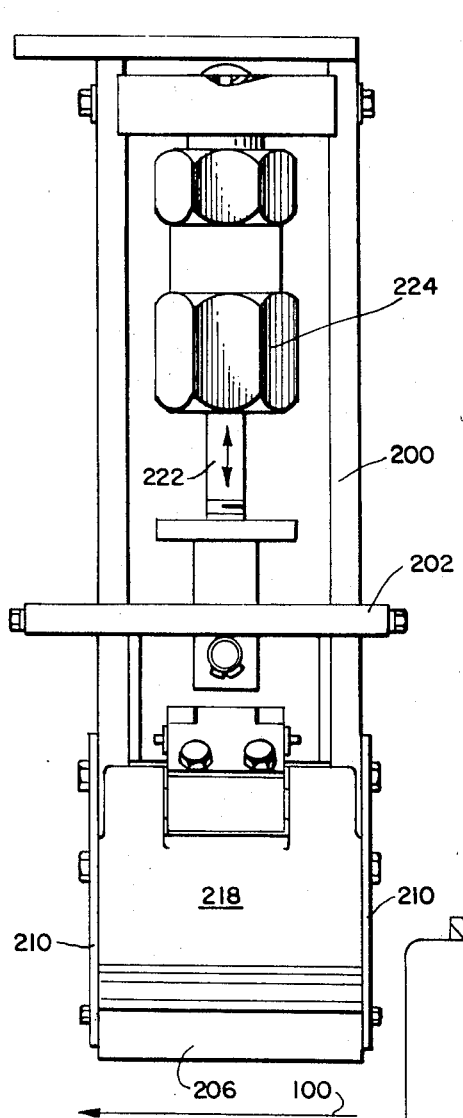
Figure 16:
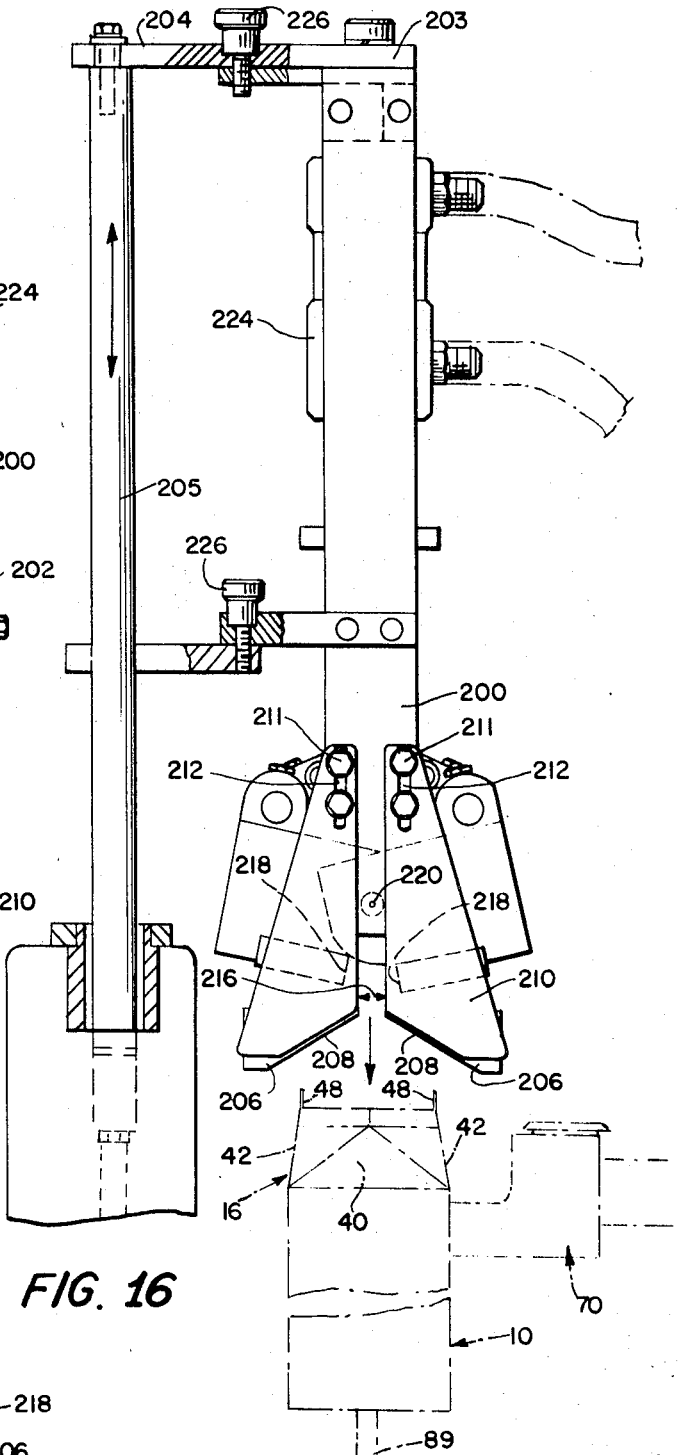
Figure 16:
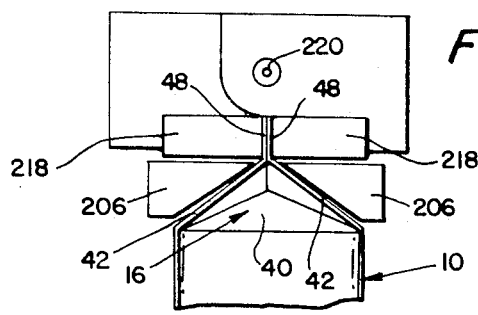
Figure 18:
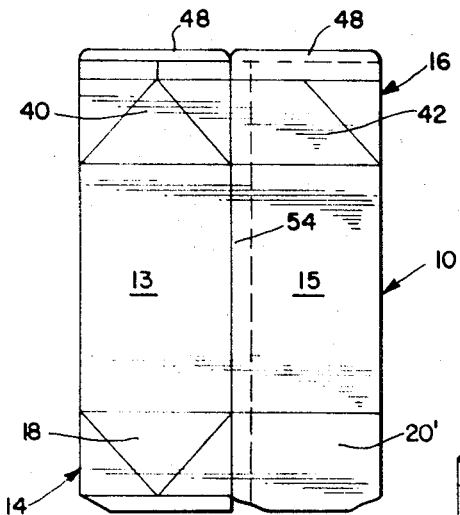
Figure 19:
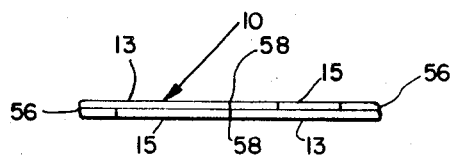
Figure 20:
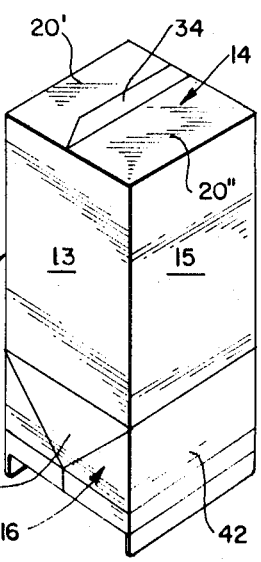
Figure 21:
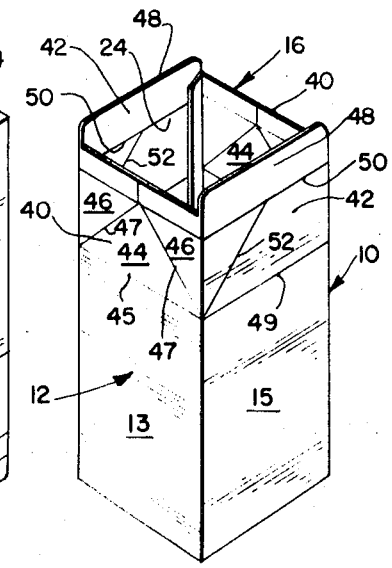
Figure 22:
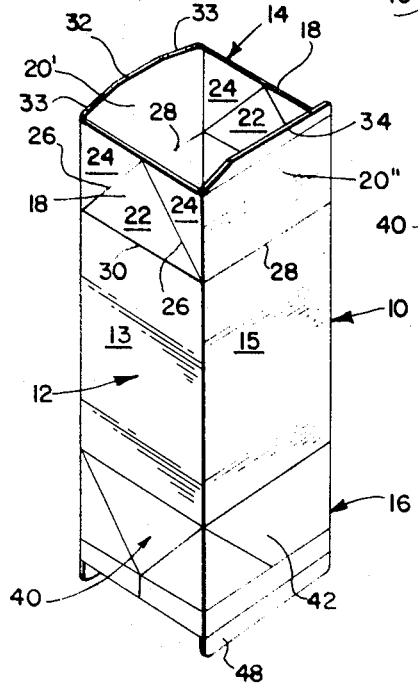
Figure 23:
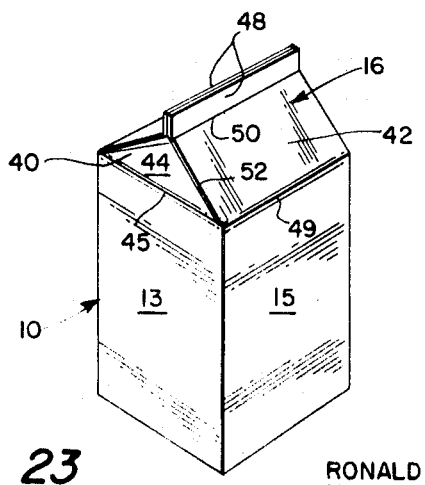

FIGS. 5(A), (B), and (C) are sequential diagrammatic views showing the insertion and erection of a container blank in the container holder;

FIG. 6 is a schematic perspective view illustrating sequential positions of the container as it passes through the machine of the present invention;

FIG. 7 is a fragmentary elevational view showing the mandrel portion of the bottom forming unit with the container in position;

FIG. 8 is an enlarged fragmentary perspective view of the mandrel locking mechanism;

FIG. 9 is an elevational view of the bottom forming unit for breaking, folding, and sealing the container's bottom closure panels;

FIG. 10 is an elevational view similar to FIG. 9 and showing, in phantom, the breaking of the bottom closure panels;

FIG. 11 is a rightside elevational view of the bottom forming unit shown in FIG. 9;

FIG. 12 is a top plan view of the bottom forming unit with the container holder and mandrel portion removed for clarity;

FIG. 13 is an enlarged fragmentary view, showing the folding of the bottom closure panels;

FIG. 14 is an elevational view of the top closure panel breaking unit with a container in position;

FIG. 15 is a fragmentary top view of the top closure panel breaking unit;

FIG. 16 is an elevational view of the top forming with a container in position;

FIG. 16(B) is a fragmentary elevation view showing the closing and sealing of the top closure panels;

FIG. 17 is a fragmentary rightside view of the top forming unit shown in FIG. 16;

FIG. 18 shows a tubular container blank in flattened form;

FIG. 19 is an end view of the blank of FIG. 18;

FIG. 20 is a perspective view of the container blank in an open and upside down position;

FIG. 21 is a perspective view similar to FIG. 20, showing the container's bottom closure panels sealed in place;

22 is a perspective view of the container blank with the bottom formed and in an upright position; and FIG. 23 is a perspective view of the container after it has been formed, filled, and sealed by the machine of this invention.

Reference will now be made in detail to the present preferred embodiments of the invention, examples of which are illustrated in the accompanying drawings.

For the purposes of clarity and simplification, only those parts of the various mechanisms for forming, filling, and sealing the container blank that are essential to an understanding of the present invention have been illustrated in the drawings.

CONTAINER

The machine of the present invention is particularly adapted to form, fill, and seal plastic-coated paperboard containers described, for example, in U.S. Pat. Nos. 3,120,333 and 3,120,335. The disclosures of these patents are incorporated herein by reference, and reference should be made to these patents for a more complete description of the containers which may be formed, filled, and sealed by the machine of the present invention.

These containers have particular utility for the packaging of milk, and the present invention will be described as it relates to a milk packaging operation, but it is to be understood that the machine of the present invention may also be utilized for the packaging of other materials in similar containers. Further, the machine of the present invention can readily be used for the forming, filling, and sealing of different size containers of varying lengths and cross-sectional dimensions.

With reference to FIGS. 18 to 23, there is illustrated a typical container 10 for use with the machine of the present invention. Container 10 is generally supplied in flattened form, as shown in FIGS. 18 and 19, and when opened, as shown in FIG. 20, is a tubular body 12 of generally rectangular cross section. Tubular body 12 includes a first pair of opposed sidewalls 13, and a second pair of opposed sidewalls 15, interconnected along their vertical sides to walls 13. Bottom closure panels 14 and top closure panels 16 for the container are formed from integral extensions of the container's sidewalls and are folded and sealed in such a manner as to provide a closed container, as shown in FIG. 23.

Bottom closure panels 14 include a pair of opposed bottom gusset panels 18 and a pair of opposed bottom flaps 20, integrally connected along their vertical sides to bottom gusset panels 18. Bottom gusset panels 18 include a triangular portion 22, separated from sidewalls 13 by a fold line 30, and a pair of triangular fold-back portions 24 separated from triangular portion 22 by fold lines 26.

Bottom flaps 20 are separated from container sidewalls 15 by fold lines 28 and the projecting edge 32 of one bottom flap 20' is chamfered slightly on both ends at 33, defining a tuck-in extension that is inserted under a corresponding projecting edge 34 defining a tuck-out extension on the other bottom flap 20''.

Thus, when the bottom is formed, triangular portions 22 of opposed gusset panels 18 fold inwardly toward one another and their associated pairs of fold-back triangular portions 24 fold back against the inner faces of bottom flaps 20. The tuck-in edge 32 on bottom flap 20' is then inserted between the inner face of bottom flap 20'' and the fold-back portions 24 of gusset panels 18 and the edge 34 of the tuck-out flap overlies the outer face of bottom flap 20'. When fully folded in the manner described, the bottom closure panels are pressed flat and heat sealed in this position to form a bottom for the container, as shown in FIG. 21.

Top closure panels 16 are similar to bottom closure panels 14 and include a pair of opposed top gusset panels 40 and a pair of opposed roof closure panels 42 interconnected along their vertical sides with top gusset panels 40. Gusset panels 40 include a triangular portion 44 separated from side walls 13 by a fold line 45, and a pair of fold-back triangular portions 46 separated from triangular portion 44 by fold lines 47. Roof panels 42 are separated from side walls 15 by fold lines 49, and projecting from the outer lateral edge of each roof closure panel 42 is a sealing flap 48 separated from the roof panel by a fold line 50.

When the top closure is formed, triangular portions 44 of top gusset panels 40 fold inwardly toward one another and their associated pairs of triangular fold-back portions 46 fold back against the inner face of roof panels 42, thus bringing sealing flaps 48 into abutting relationship and forming a top to the container having a gabled configuration, as shown in FIG. 23.

The top closure of the container also includes an extensible pouring spout which is defined by one of the gusset panels and a pair of score lines 52 on adjacent sides of both roof panels 42, as is well known to those skilled in the art.

The container is generally supplied in flattened form, as shown in FIGS. 18 and 19, with side seam flap 54 already sealed in place and having a first pair of folded corners 56 and two opposed longitudinal score lines 58 for forming a second pair of folded corners when the containers is in open position, as shown in FIG. 20. The machine of the present invention, therefore, is particularly designed to produce finished and filled cartons from these flattened blanks, but it will be obvious to one skilled in the art that containers prefabricated to a greater degree can also be used with the present machine.

GENERAL MACHINE DESCRIPTION

The present invention provides a machine for automatically and sequentially forming, filling, and sealing the above-described, thermoplastic-coated paperboard container blanks. Flattened tubular container blanks 10, as shown in FIG. 18, are continuously fed to the machine and are then oriented and fed in sequence on an automatic and continuous basis through the machine's forming, filling, and sealing operations. Upon completion of the machine's operations, filled containers, as shown in FIG. 23, are discharged and may be transferred to another operation, such as a machine for packaging the filled and sealed containers in a larger case.

In accordance with the invention, means are provided for holding a container blank 10 in an open and upright position and for automatically and sequentially feeding the container blank through a container-forming, filling, and sealing operation. It is to be understood that the expression "open" as used in the specification and claims with reference to the container blank, refers to the blank in an unfolded position in which it has a generally rectangular cross section and not to the container itself which may be closed or opened depending on its location in the machine.

Figure 1:
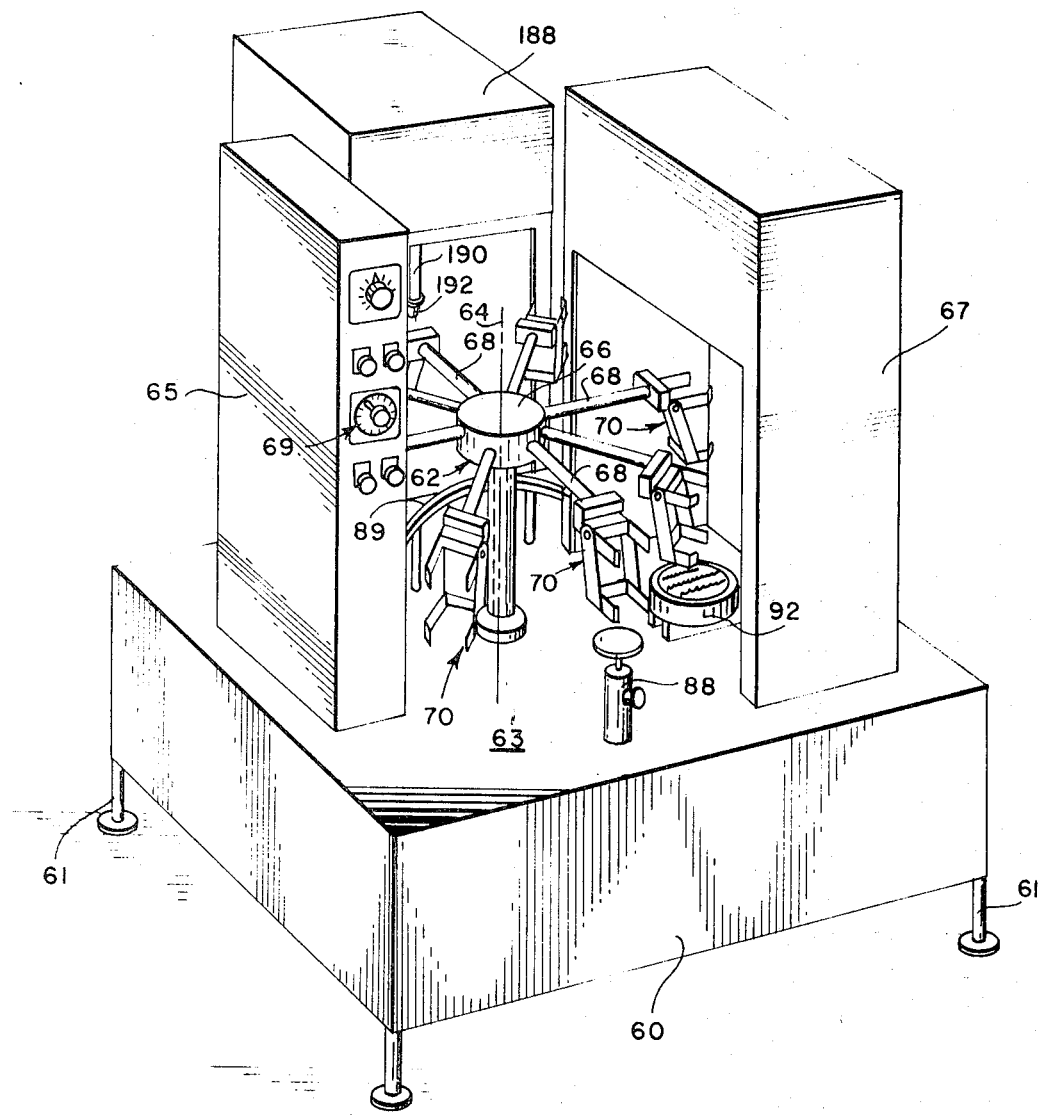
FIG. 1 is a perspective view of a container forming, filling, and sealing machine embodying the present invention.

As embodied, and with reference to FIG. 1, this means includes a support base, or table 60, having legs 61 and supplied with electric power, compressed air, and hydraulic fluid from appropriate sources. A turret wheel assembly 62 is rotatably mounted to the top 63 of table 60 about a vertical axis 64. Turret assembly 62 has a hub 66 and a plurality of arms 68, eight of which are shown in the drawings, radiating outwardly in a horizontal direction from hub 66 at equal angles of separation. A container holder 70 is secured to the outer end of each arm 68, each holder holding a container blank in an open and upright position from its external vertical sides. Superstructures 65 and 67 are mounted on either side of turret assembly 62 for supporting the machine's operating mechanisms and the operator's control panel 69 is located on the face of superstructure 65 for easy access by the operator.

Figure 3:
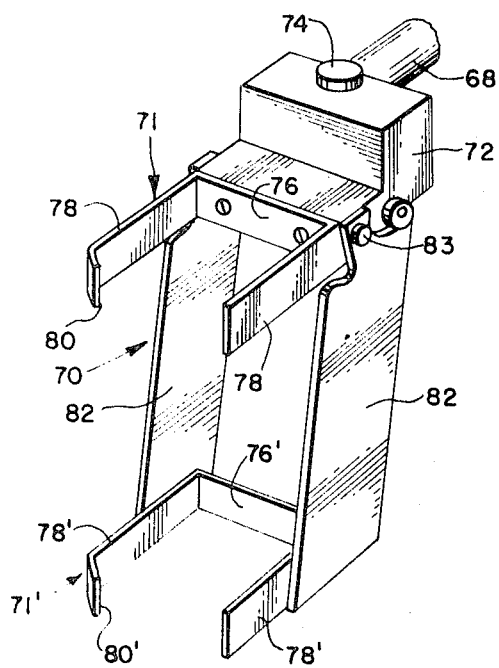
FIG. 3 is a perspective view of a container blank holder for use with the machine of this invention.

As best shown in FIG. 3, container holder 70 includes a mounting block 72 that slips onto the end of a turret arm 68 and a thumbscrew 74 threaded into block 72 to secure it to the arm. A backing plate 76 is mounted to the outer face of mounting block 72 and a pair of side flanges 78 integral with backing plate 76 extend normally outward from the ends of the backing plate defining a generally U-shaped holder 71 having a width and depth slightly larger than the outer dimensions of the tubular body 12 of an open container blank. A locking lip 80 extends inwardly from the outer end of one of the side flanges 78 toward the other side flange and outwardly from the end of that flange to lock and hold a container blank within the U-shaped holder in an open and upright position.

Preferably, container holder 70 is designed for use with container blanks of similar cross section but varying lengths, such as half-pint, pint, and quart size containers. A second U-shaped holder 71', therefore, as shown in FIG. 3, comprising a backing plate 76', side flanges 78', and a locking lip 80', is suspended by bars 82 from mounting block 72 in vertical alignment below first U-shaped holder 71 for engaging the lower portions of a relatively longer length container, such as a quart size, while upper U-shaped holder 71 engages the upper portions of the container blank.

Figure 4:
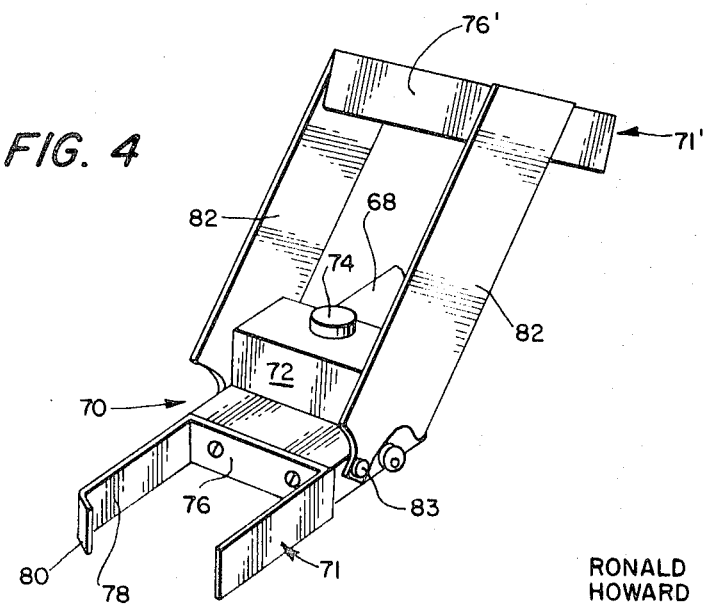
FIG. 4 is a perspective view similar to FIG. 3 and showing the container holder for use with relatively shorter length containers.

Means are further provided for pivoting lower U-shaped holder 71' to an out-of-the-way position, so that upper U-shaped holder 71 can be used alone for holding relatively smaller length containers, such as pint and half-pint sizes. As embodied, this means comprises pivotally mounting bars 82 to mounting block 72 at 83 to permit lower U-shaped holder 71' to be pivoted up and over top U-shaped holder 71 and into an out-of-the-way position, as shown in FIG. 4.

For use with containers having a larger cross-section, such as half-gallon and gallon containers, holder 70 is removed by unscrewing thumbwheel 74, pulling it off arm 68, and inserting in its place a similar holder having the correct cross-sectional dimensions.

Figure 5:
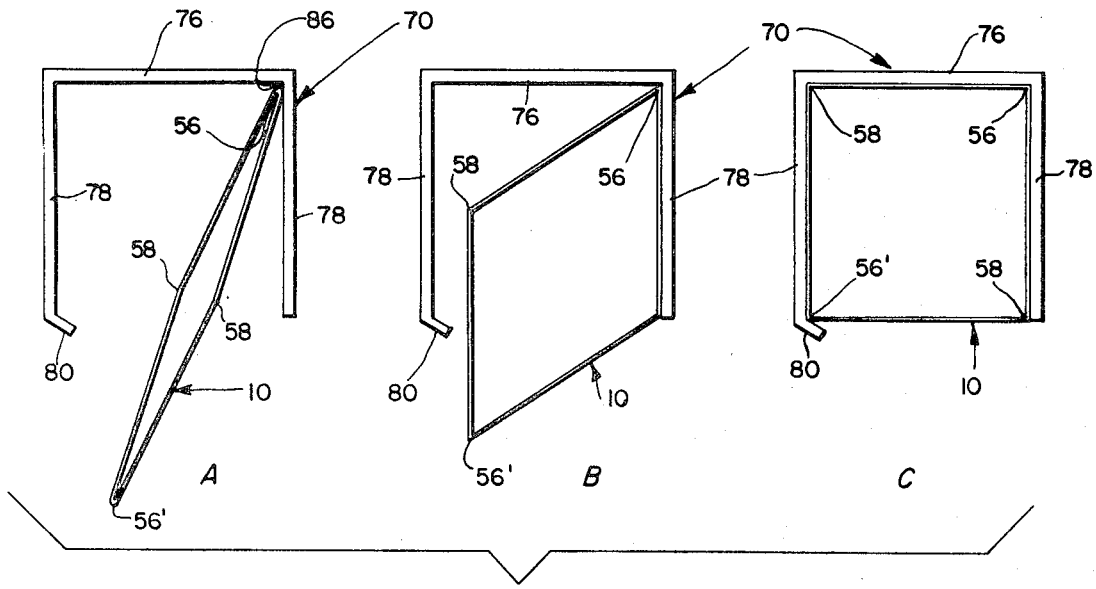

To erect a container blank 10 within holder 70, and as best shown in the sequence of drawings of FIG. 5, one of the folded corners 56 of a flattened container blank 10 is inserted into the corner 86 (see FIG. 5(A)) of the U-shaped holder 71 diagonally opposed from locking lip 80. The blank is then pushed all the way into the holder, flanges 78 and backing plate 76 cooperating to open the container (see FIG. 5(B)) until the opposite folded corner 56' of the container blank locks behind locking lip 80 (see FIG. 5(C)). Due to the container blank's inherent resiliency and tendency to return to its flattened form, lip 80, acting against this inherent resiliency, tends to keep the container blank snugly in holder 70 in an open and upright position.

The container blanks may either be inserted into container holders 70 by hand, in the manner described, or suitable means (not shown) may be provided for automatically positioning the blanks in the holder. For a more complete description of container holder 70 and the method of erecting a container blank within the holder, reference should be made to our copending application, Ser. No. 850,527, filed Aug. 15, 1969, and entitled "Container Erecting and Holding Device" which is assigned to the assignee of the present invention and the disclosure of which is herein incorporated by reference.

In keeping with the concept of this invention, machine cycling means are provided for rotating turret assembly 62 and attached container holders 70 about vertical axis 64 with an indexing motion for sequential registration of each of holders 70 with a plurality of machine stations for forming, filling, and sealing the container blanks and for actuating and controlling mechanisms at these stations for carrying out the necessary operations. As embodied, this machine cycling means includes an indexing device 75 mounted within table 60 and connected to the main power shaft 73 of turret assembly 62 (see FIG. 6) for rotating the assembly in the prescribed manner, and electric and pneumatic control circuits for actuating the hydraulic cylinders and other mechanisms at the various machine stations as more fully described below.

Figure 2:
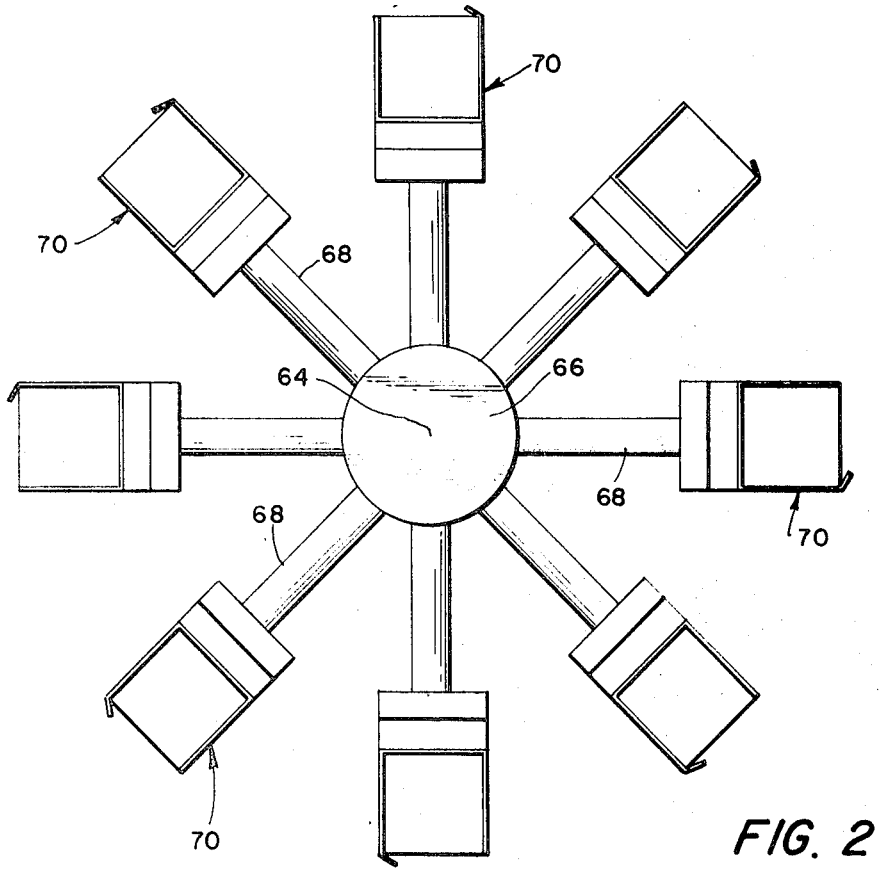
FIG. 2 is a top view of the turret assembly.

With a turret assembly having eight radial arms and eight corresponding machine stations, for example, as shown in FIGS. 1, 2, and 6, the machine cycling means should rotate the turret assembly one-eighth of a revolution in a timed manner to periodically and sequentially index each of holders 70 with each of the machine stations, and a suitable dwell time should be provided at each station to permit the necessary operations to be performed on the container. The machine cycling means are conveniently controlled by the operator from control panel 69.

Machine cycling means suitable for use with the present invention are well known to those skilled in the art and are shown and described, for example, in U.S. Pat. Nos. 3,196,760 to Terry; 3,212,413 to Allen et al.; and 3,364,826 to Austin et al., and the disclosure of these U.S. patents is incorporated herein by reference.

Briefly, in operation, and as best shown in FIG. 6, a container blank 10 is inserted into a container holder positioned at loading station A by the machine operator or by other suitable means (not shown) in the manner described above, with top closure panels 16 up, and bottom closure panels 14 down. A vertically adjustable platform 88 is mounted to the top of table 60 at loading station A for vertically aligning a container in the proper position in container holder 70.

After a container blank is positioned in container holder 70, turret assembly 64 indexes the holder to a bottom heating station B where means are provided for heating the thermoplastic coating on bottom closure panels 14 of the container. Meanwhile, a second container blank is inserted into the next container holder which is now at loading station A.

On a second index, the container is rotated to a bottom forming station C where bottom closure panels 14 are broken, folded, and sealed in place to form a closed bottom to the container. A third index then moves the container to a top breaking station D where the fold lines between top closure panels 16 and the sidewalls 13 and 15 of the container blank are broken.

The container is then given a fourth index to a liquid filling station E where the container is filled with the correct volume of liquid. The fifth index moves the container to a top heating station F where the thermoplastic coating on top closure panels 16 is heated and the sixth index to a top forming station G. At station G, the top closure panels 16 are closed and sealing flaps 48 are sealed together to form a sealed gabled top to the container.

On a seventh index, the container rotates to a discharge station H where the formed, filled, and sealed container can be removed by hand or discharged by any other suitable means (not shown). On the last and eight index, the holder will rotate back to loading position A to receive another container blank and start the cycle over again. Preferably, and as shown in FIG. 6, a guide rail 89 is mounted to top 63 of table 60 for supporting the bottom of the container blanks from before top breaking station D to after top forming station G.

Thus, it can be seen that with a container blank in each container holder 70, each of the machine's stations will perform a selected operation on the blank positioned at that station simultaneously with the operation of all the other machine's stations; and that each of the holders will, in turn, be fed in sequence to each of the machine's stations so that the necessary forming, filling, and sealing operations can be performed on each of the container blanks.

Further, and in accordance with the present invention, the container blanks are always held by container holder 70 throughout their path of travel through the machine in an open and upright position from their external vertical sides, thereby eliminating the need for any removal, transfer, and realignment equipment heretofore used in the prior art.

The individual features of the machine of the present invention will now be explained and described in greater detail.

At loading station A, and as described above, a container blank 10 is inserted into a container holder 70 and the bottom edges 90 of bottom closure panels 14 are positioned against the top of adjustable platform 88 so that the container will be in the proper vertical alignment with respect to the machine's operating mechanisms located at the various machine stations. For the sake of convenience and ease of illustration, a quart size container has been illustrated in the drawings, but, as described above, the machine is readily adaptable to containers of different lengths and cross-sectional dimensions. For use with a half-pint container, for example, lower U-shaped holder 71' is pivoted up and back to an out-of-the-way position and platform 88 is adjusted vertically upward to permit proper alignment of the half-pint container blank in upper U-shaped holder 71.

At station B, heater means, such as an electric resistance heater 92, are provided for heating the thermoplastic coating on the bottom closure panels 14 of a container blank 10 positioned at that station. Means (not shown) are preferably provided for adjusting heater 92 in a vertical direction so that it can be spaced the proper distance from bottom closure panels 14 depending upon the length of the container being used. As is well known to those skilled in the art, the heat generated by heater 92 in combination with the dwell time that the container remains at heating station B, should be sufficient to put the thermoplastic coating on the bottom closure panels in a softened condition for bonding at bottom forming station C.

BOTTOM FORMING

In accordance with the invention, bottom forming means are provided at station C for breaking, folding, and sealed the unbroken and heated bottom closure panels 14 of a container blank to provide a sealed bottom to the container.

As embodied, and as shown in FIGS. 7 to 12, this means comprises a mandrel 94 located above the horizontal plane of rotating container holders 70 and having a cross-sectional dimension slightly less than the internal dimensions of an open container blank. A bending edge 96 is provided on each of its four lower corners. Mandrel 94 is connected to a piston rod 98 of a hydraulic cylinder (not shown) that is mounted to superstructure 67 of table 60. The thrust of the cylinder is adjustable so that the location of the mandrel's bending edges 96 when the mandrel is in its lowermost position is adjustable depending on the length of the container being formed, as will be fully described below.

The bottom forming means further includes a locking means for locking the mandrel in place. As embodied, and as best shown in FIGS. 7 and 8, the locking means 108 comprises a retractable yoke 110 that slides in a track block 112 in a direction transverse to the direction of travel of the mandrel. Track block 112 is mounted to internal beams 113 of superstructure 67. Corresponding slots 114 are provided in piston rod 98 for receiving yoke 110 to lock the mandrel in place. Yoke 110 is connected to the piston rod 116 of a hydraulic cylinder (not shown). As best shown in FIG. 7, a plurality of slots 114 are provided along the length of rod 98 so that mandrel 94 can be locked in the proper position depending on the length of the container.

As shown in FIGS. 9—12, the bottom-forming means also includes a press head 120 which is secured to the upper end of the vertically reciprocating shaft 122 of a hydraulic cylinder 123 directly beneath mandrel 94. A press plate 124, which cooperates with the lower face 95 of mandrel 94 to seal the bottom of the container closed, is secured to the top of press head 120. Cylinder 123 is mounted to the underside of a platform 131 (see FIG. 10), which platform rests on the top of a pair of spaced support blocks 138 mounted to the top 63 of table 60 (see FIG. 11).

As best shown in FIGS. 9 and 10, a pair of breaker plates 126 are each pivotally connected at 128 to a depending flange 129 of platform 131 and are located on opposite sides of reciprocating press head 120. As shown in FIG. 12, breaker plates 126 are aligned in a plane substantially transverse to the direction of travel 100 of a container through bottom forming station C.

Breaker plates 126 are provided with inwardly directed breaker arm 130 at their upper ends which act on opposed bottom gusset panels 18 of the container in a manner to be described below. Accordingly, each breaker plate 126 is provided with a cam track 132, and a cam wheel 134 is rotatably mounted to a flange 135 of press head 120. Thus, as press head 120 moves up and down, cam wheel 134 riding in cam track 132 rocks breaker plates 126 in-and-out (as shown in FIG. 10) about their stationary pivots 128.

As shown in FIGS. 11 and 12, four spaced reciprocating cam plates 136 are secured by bolts 137 to platform 131. Each cam plate 136 is provided with a cam track 140. As best shown in FIG. 12, a pair of roller bars 142 are rotatably mounted at each end to the upper end of one of a plurality of folding arms 144. The lower ends of folding arms 144 are pivotally connected at 145 to press head 120 and each is provided with a cam follower 146 that moves along the cam track 140 in cam plates 136.

Thus, folding arms 144 and attached roller bars 142 pivot in-and-out in a direction parallel to the direction of travel of a container (as shown by arrow 100) and transverse to the in-and-out movement of breaker plates 126 as press head 120 moves up-and-down and cam followers 146 move through stationary cam track 140. Roller bars 142 act on bottom closure flaps 20 of the container in a manner to be described below. The height of platform 131, and hence cam plates 136, is vertically adjustable by interchanging blocks 138 so that breaker arms 130 and roller bars 142 can be aligned with the bottom closure panels 14 of different size containers having varying lengths.

As best shown in FIG. 11, the cam followers 146' on the right side of press head 120 are mounted to their folding arms 144 slightly above the cam followers 146" on the leftside of the press head. Thus, cam followers 146' move through their cam track 140 slightly ahead of cam followers 146" causing the right roller bar 142' to move in toward the center of press plate 124 slightly ahead of left roller bar 142". The purpose of advancing movement of right roller bar 142' is to permit it to act on tuck-in closure flap 20' before left roller bar 142" acts on tuck-out closure flap 20" to ensure proper folding of the bottom closure panels.

In operation, and with reference to FIGS. 7 to 12, with mandrel 94 in its uppermost position (see FIG. 7) and press head 120 in its lowermost position (see FIGS. 9 and 11), a container holder 70 holding a container blank 10, is indexed into position at the bottom forming station C. Container blank 10 is positioned with container holder 70 so that when the container is at station C, bottom gusset panels 18 are adjacent breaker arm 130 and bottom closure flaps 20 are adjacent roller bars 142, and more particularly, bottom tuck-in flap 20' is adjacent right roller bar 142'.

With the container in position in the prescribed manner, the mandrel cylinder is actuated by the machine cycling means to lower mandrel 94 down into the top of an opened container blank 10 until the bending edges 96 on mandrel 94 are aligned with the bottom closure fold lines 28 and 30 (see FIGS. 9 and 11). The machine's cycling means then actuates mandrel lock cylinder to advance locking yoke 110 into slots 144 in mandrel piston rod 98 and lock mandrel 94 in place.

After mandrel 94 is locked in position, the shaft 122 of cylinder 123 is actuated upwardly by the machine cycling means, thus moving press plate 124 upward with respect to platform 131 and toward bottom closure panels 14. Upward movement of press head 120, as shown in FIG. 10, causes breaker plates 126 to rock with respect to press plate 124, thereby bringing breaker arms 130 into contact with bottom gusset panels 18. As breaker arms 130 continue moving in toward each other, they push in on gusset panels 18 which, in turn, pull in on flaps 20 and, in cooperation with mandrel 94, break the fold lines 30 and 28 of the bottom gusset and flap panels, respectively. At the end of their inward stroke, and when cam wheels 134 are at the midposition of cam tracks 132, as shown in phantom in FIG. 10, breaker arms 130 have performed their function and begin moving out away from each other to their original position so as not to interfere with roller bars 142.

Prior to this time, however, the upward motion of press head 120 will move roller bars 142 toward each other as cam followers 146 ride through stationary cam tracks 140. Thus, bars 142 will begin to act on bottom closure flaps 20 immediately after they have been broken in by breaker arms 130. As press head 120 continues to move upward, roller bar 142' begins to push inwardly and upwardly on bottom tuck-in flap 20' slightly in advance of left roller bar 142'', which is pushing inwardly and upwardly on bottom tuck-out flap 20''. When cam followers 146 have reached the midpoint of their path of travel in cam tracks 140, bottom closure flaps 20 are in the position shown in FIG. 13.

As press head 120 continues upward, cam tracks 140 cause roller bars 142 to move away from each other and simultaneously bring press plate 124 into engagement with tuck-out flap 20'' to prevent the bottom closure panels from opening up and becoming untucked. Further upward movement of press head 120 clears roller bars 142 from press plate 124 and pushes press plate 124 up into contact with the lower surface 95 of locked mandrel 94, putting pressure on bottom closure panels 14 and causing them to be bonded together to form a liquidtight bottom seal to the container.

Preferably, and as shown in FIG. 12, the upper surface of press plate 124 is provided with channels 148 and 150 to provide clearance for the thickened portions of the container bottom caused by the overlapping ends of bottom closure flaps 20 and the side seam 54 of the container body.

When the press head 120 reaches its uppermost position, and after a suitable dwell time to ensure sealing of the container bottom, the machine cycling means reactuates the mandrel lock cylinder to retract locking yoke 110 to its unlocked position and thereafter reactuates the mandrel cylinder and pulls mandrel 94 out of the container. Simultaneously, the machine cycling means lowers press head 120 away from the bottom of the container. The in-and-out motion of breaker arms 130 and roller bars 142 by downward movement of press head 120 does not affect the bottom closure panels 14 of container 10, since they have now been sealed in place. With the operating parts of the bottom forming means returned to their original position, the machine cycling means rotates turret 62 and indexes the bottom formed container still held in its original container holder 70 to top breaking station D.

TOP BREAKING

In accordance with the invention, means are provided at top breaking station D for breaking the fold lines 45 between top gusset panels 40 and sidewalls 13, and the fold lines 49 between roof closure panels 42 and sidewalls 15 of the container. As embodied, and as shown in FIG. 14, this means comprises an anvil 156 having a cross-sectional dimension slightly less than the internal dimensions of the open container blank. Anvil 156 is provided with a bending edge 158 around the four sides of its upper surface and is connected to a piston rod 160 of a hydraulic cylinder (not shown) that is mounted within the superstructure 67 of table 60.

The top breaking means further includes a breaker head 164 pivotally mounted at 166 to a supporting plate 168 of superstructure 67. A locking pin 170 in plate 168 is inserted through either of two apertures 172 or 174 in breaker head 164 to lock the head in one of two operating positions 90° out of phase with each other. As will be more fully described below, the purpose of this adjustment is to permit the top breaking means to be used with different types of container blanks.

As best shown in FIG. 14, a pair of top breaking arms 176 are pivotally mounted at 178 to breaker head 164. A wobbling block 180 is affixed at one end to each arm 176 and at the other end is pivotally connected at 181 to a lever arm 182. Arms 182 are pivotally connected at 183 to a block 184 on the piston rod 186 of a hydraulic cylinder (not shown). Thus, as shown in FIG. 14, as block 184 reciprocates up-and-down in response to actuation of the cylinder, top breaker arms 176 will pivot in-and-out toward and away from anvil 156.

In operation, breaker head 164 is rotated to one of its two operating positions so that breaker arms 176 are adjacent top gusset panels 40 when a bottom formed container is indexed to top breaking station D (see FIG. 6). The machine cycling means then actuates the cylinder of piston rod 160 and lowers anvil 156 down into the top of an open container blank until the top bending edges 158 of the anvil are aligned with the top closure fold lines 45 and 49. After the anvil 156 is in position, the machine cycling means actuates the cylinder of piston rod 186 pulling block 184 upward and causing top breaker arms 176 to pivot in toward each other.

As breaker arms 176 continue to move inward, they contact top gusset panels 40 and push inward on panels 40 to break the fold lines 45 and 49 between both the top closure panels 40 and 42 and the container's sidewalls. At the end of its upward stroke, the cylinder of piston rod 186 immediately begins to push block 184 down and thereby pivot breaker arms 176 away from each other and back to their original out-of-the-way position.

The machine cycling means then reactuates the cylinder of piston rod 160 and draws anvil 156 up out of the top of the container and also into an out-of-the-way position. With the operating parts of the top breaking means returned to their original position, the machine cycling means rotates turret 62 and index the top broken container to filling station E.

It will be seen that the bottom forming means at station C and the top breaking means at station D have been described for use with a container where the bottom gusset panels 22 form a part of the container sidewalls 13 and the top gusset panels 40 form a part of container sidewalls 15. Thus, breaker arms 130 of the bottom forming means act in a direction transverse to the direction of travel of the container through the bottom forming station, whereas the top breaking arms 176 act in a direction parallel to the direction of travel of the container top breaking station.

In the construction of some container blanks, however, and in particular in larger sizes, top gusset panels 40 are connect to the same sidewalls as bottom gusset panels 22 (see FIG. 20). In this case, it is necessary for top breaker arms 176 to act in a direction transverse to the direction of travel of the container through top breaking station D. Hence, by pivoting breaker head 164 about pivot 166 and locking it into one of its two operating positions 90° out of phase with each other, these variations in container construction can be accommodated by the machine of the present invention.

As best shown in FIGS. 1 and 6, means are provided for filling a container held in an upright and open position by its holder 70 at filling station E with a controlled amount of liquid. The filling means are conventional and include a supply tank 188, a filling stem 190 located directly above container 10 when it is indexed to the filling station, and a dispensing valve 192 for controlling the flow of liquid passing from the tank into the container. A time control switch 194, schematically illustrated in FIG. 6, and having an actuating arm 196, is provided for metering the quantity of liquid passing into the container. Time control switch 194 comprises electrical control circuits that actuate the dispensing valve and automatically shut it off after a prescribed period of time corresponding to the volume of flow desired. The switch 194 and its operating circuits are not illustrated in detail since it is conventional and is well within the knowledge of those skilled in the art.

Actuating arm 196 of switch 194 is positioned with respect to a container holder 70 so that it is only contacted when a container blank 10 is held with container holder 70. Upon movement of the container away from filling station E, actuating arm 196 returns to its original position and is now ready to be engaged by the next container blank indexed to that station.

After the container has been filled at filling station E, the machine cycling means again rotates turret wheel 62 and indexes the filled container to top heating station F. In accordance with the invention, heater means 198 are provided at station F similar to the heating means at bottom heating station B for heating the thermoplastic coating on top closure panels 16 and putting them in condition for bonding at subsequent top forming station G.

TOP CLOSING AND SEALING

In accordance with the invention, top forming means are provided at station G for closing and sealing the container's top closure panels 16 that have been prebroken at station D and heated at station F.

As embodied, this means comprises a top closing head 200 pivotally connected at 203 through a plate 204 to the piston 205 of a hydraulic cylinder (not shown). The cylinder is mounted to table 60 within superstructure 65 and reciprocates head 200 vertically between a raised and lowered position.

The top closing means further includes a pair of spaced closing guides 206, each guide having a slanted face 208 adjacent one another to form a downwardly directed V-shaped opening therebetween with the longitudinal direction of the V-shaped opening lying parallel to the direction of travel of the container through top closing station G.

The guides are secured at their ends to a plate 210 that is mounted to head 200 so that the slope of the guides' internal faces 208 is approximately the same as the slope of roof closure panels 42 when the roof panels are in closed position. Preferably, plates 210 are mounted to head 200 by bolts 211, extending through elongated slots 212 in plates 210 and threaded into head 200 to permit vertical adjustment of guides 206 with respect to closing head 200. A gap 216 is provided at the top of the V-shaped opening between the inner faces of guides 206 through which sealing flaps 48 of the container extend when top closing head 200 is brought down against the container.

A pair of sealer jaws 218 for bonding sealing flaps 48 together are pivotally mounted to top closing head 200 at 220 above the top of guides 206. Sealer jaws 218 are connected through suitable linkage to the piston rod 222 of a hydraulic cylinder 224 mounted in top closing head 200. Upon actuation, cylinder 224 pushes down on rod 222 and pivots jaws 218 toward each other in a direction transverse to the length of sealing flaps 48.

In operation, and when a filled container having prebroken and heated top closure panels 16 is indexed to top forming station G, the machine cycling means actuates the top closing head cylinder to move top closing head 200 down and to bring the internal faces 208 of the guides 206 into contact with roof closure panels 42 of the container 10. As head 200 continues to move downwardly, the faces of guides 206 push down on roof closure panels 42, bringing them together to form a gabled top to the container. When guides 206 have reached their lowermost position and lie flat against the top surface of roof closure panels 42, sealing flaps 48 will be in abutting engagement and will extend up through the gap 216 between the guides and lie adjacent sealing jaws 218. Cylinder 224 is then actuated causing sealing jaws 218 to pivot toward each other about 220 and to press from opposite sides against the top's sealing flaps 48 (see FIG. 16(A)). The pressure from sealing jaws 218 is permitted to remain momentarily to cause flaps 48 to be sealed together, thus sealing the container closed.

After the container has been sealed, the machine cycling means reactuates cylinder 224 to open jaws 218 and then the top closing head cylinder is actuated to pull the head and guides 206 up out of contact with the top of the sealed container. The machine cycling means then rotates turret assembly 62 to index the filled container to discharge station H.

As discussed above in connection with top breaking station D, top closing head 200 is pivotally mounted at 203 to plate 204 of piston rod 205 so that it can be swung between two operating positions 90° out of phase with each other and locked in place by pins 226 for variations in container construction.

At discharge station H, the machine operator from his load position at loading station A, conveniently removes the filled container from its container holder 70. Alternatively, means (not shown) may be provided for automatically discharging the filled container from its container holder at discharge station H by pushing it down onto a suitable conveyor or the like. The machine cycling means then indexes the empty container holder from discharge station H back to loading station A for the next machine cycle.

The present invention therefore provides a practical machine for feeding tubular container blanks through a forming, filling, and sealing operation in a planned sequence of steps, while continuously holding the container blank in an open and upright position from its external vertical sides to eliminate the need for equipment to remove, transfer, and realign the container blanks between machine operations. The invention thereby simplifies the mechanical operations of the machine and minimizes its cost of fabrication, resulting in an increase in the efficiency, economy, and quality of the entire packaging operation.

The invention in its broader aspects is not limited to the specific details shown and described, and departures may be made from such details without departing from the principles of the invention and without sacrificing its chief advantages.

We claim:

1. A machine for automatically and sequentially forming, filling, and sealing tubular container blanks coated with a thermoplastic material and having top and bottom foldable closure panels comprising:
   a. a support base;
   b. a turret wheel mounted to the support base for rotation about a vertical axis;
   c. a plurality of container holders mounted to said turret in spaced relationship, each of said holders receiving and gripping the external vertical sides of a container blank to hold the container blank in an open and upright position;
   d. means defining a plurality of machine stations spaced about the axis of rotation of the turret wheel, said machine station means including;
      i. bottom heat sealing means for heat sealing the bottom closure panels of the container blanks;
      ii. filling means for filling the bottom sealed container blanks; and
      iii. top heat sealing means for heat sealing the top closure panels of the filled container blanks; and
   e. machine cycling means for rotating and indexing the turret wheel and the attached holders in a timed, sequential manner with each of the machine station means and for actuating and controlling the machine station means to form, fill, and seal the container blanks in sequence.

2. The machine of claim 1, in which the bottom heat sealing means includes:
   a. heater means for heating the container bottom closure panels at a bottom heating station; and
   b. bottom forming means actuated and controlled by the machine cycling means for breaking, folding, and sealing the heated bottom closure panels at a subsequent bottom forming station.

3. The machine of claim 2, in which the bottom closure panels comprise a pair of opposed bottom gusset panels and a pair of opposed bottom flaps interconnected with said gusset panels and in which the bottom forming means at the bottom forming station operates on unbroken bottom closure panels and includes:
   a. a vertically reciprocating mandrel mounted to the support base for vertical reciprocation between a raised and lowered position;
   b. means for reciprocating the mandrel to insert the mandrel through the top of an opened container blank held by a container holder in an upright position at the bottom forming station and to bring the mandrel down to its lowermost position within the container blank;

c. a pair of fingers cooperating with the mandrel at its lowermost position and acting on one of the pairs of panels to break inwardly the fold lines of both pairs of bottom closure panels;

d. a pair of roller bars acting on the pair of broken bottom flaps to fold inwardly and upwardly both pairs of bottom closure panels; and e. a vertically reciprocating press plate to press said pairs of folded closure panels together against the mandrel while at its lowermost position and to seal them in place.

4. The machine of claim 3, wherein said fingers and bars operate as an incident to reciprocation of the press plate.

5. The machine of claim 4, wherein the press plate is mounted to the top of a press head and the fingers are pivotally mounted with respect to the support base and are operably connected to the press head by cam means for rocking the fingers back and forth as the press head reciprocates and the roller bars are pivotally mounted to the press head and are operatively connected to the support base by cam means for moving the bars in and out as the press head reciprocates.

6. The machine of claim 5, wherein one of the pairs of opposed bottom flaps tucks in under the other bottom flap and the roller bar cam means pivots the roller bar associated with said tuck-in flap in advance of the roller bar associated with the other flap.

7. The machine of claim 3, including means for locking the mandrel at its lowermost position within the container blank.

8. The machine of claim 1, in which the top heat sealing means includes:

a. heater means for heating the top closure container panels at a top heating station; and b. top forming means actuated and controlled by the machine cycling means for closing and sealing the top closure panels at a subsequent top forming station.

9. The machine of claim 8, including means for prebreaking the top closure panels at a top closure panel breaking station prior to said top forming station and in which the top closure panels comprise a pair of opposed gusset panels and a pair of opposed roof closure panels interconnected with said gusset panels, said roof closure panels having sealing flaps to form a gabled top for the container, and in which the top forming means comprises:

a. a top closing head mounted to the support base for vertical reciprocation between a raised and lowered position;

b. a pair of spaced closing guides mounted to the head, each of said guides having a slanted face adjacent one another to form a downwardly directed V-shaped opening therebetween;

c. means for reciprocating the head to its lowermost position to lower the guides' faces onto the roof panels of a container blank held by a container holder at the top forming station and to bring the roof panels and their sealing flaps together to form a gabled closure top;

d. a pair of sealer jaws pivotally mounted to the head above said guides and located adjacent the sealing flaps when the head is in its lowermost position; and e. means for pivoting the jaws into and away from the sealing flaps to seal the container blanks closed.

10. The machine of claim 9, in which the top closure panel breaking means comprises:

a. a vertically reciprocating anvil for insertion into the top of an opened container blank held by a container holder at the top breaking station;

b. a top breaking head mounted to the support base; and c. a pair of breaking fingers pivotally mounted to the top breaking head and acting against one of the pairs of panels in cooperation with the anvil to break the fold lines of both pairs of top closure panels.

11. The machine of claim 10, including means for pivoting the top closing head and the top breaking head between two operating positions 90° out of phase with each other.

12. The machine of claim 1, in which the turret wheel has a plurality of radial arms and a container holder is mounted to the end of each of said arms, and the machine has a corresponding number of machine stations for carrying out the forming, filling, and sealing operations, said machine cycling means rotating the turret wheel and sequentially indexing each of said container holders with each of said machine stations in a repeating cycle.

13. The machine of claim 12, in which the turret wheel has eight radial arms and the machine has eight successive machine stations, a first station for loading a container blank into a container holder, a second station for heating the bottom closure panels, a third station for breaking, folding, and sealing the bottom closure panels, a fourth station for breaking the top closure panels, a fifth station for filling the bottom sealed container, a sixth station for heating the top closure panels, a seventh station for closing and sealing the top closure panels, and an eight station for discharging the sealed and filled container from the container holder.

14. The machine of claim 13, including a guide rail for supporting the bottom of the container blank from before the top breaking station to beyond the top closing and sealing station.

15. The machine of claim 13, including aligning means at the first station for aligning the container blank vertically in the container holder.

16. In a machine for forming, filling, and sealing a container blank coated with a thermoplastic material and having opposed top foldable roof closure panels with sealing flaps adapted to form a gabled top to the container, a top forming unit for closing and sealing prebroken and heated roof closure panels of a container blank held in an upright position comprising:

a. a pair of spaced closing guides, each having a slanted face adjacent one another to form a V-shaped opening therebetween;

b. means for bringing the faces of the guides down onto the opposed roof closure panels to bring the roof panels and their sealing flaps together to form a gabled top closure;

c. a pair of opposed sealer jaws mounted above said guides and located adjacent opposite sides of the sealing flaps when they are together; and d. means for moving the jaws against the sealing flaps to seal the container blank closed.

17. In a machine for forming, filling, and sealing a container blank coated with a thermoplastic material and having a pair of opposed bottom foldable gusset closure panels and a pair of opposed bottom closure flap panels interconnected with the gusset panels, a bottom forming unit for breaking, folding, and sealing the bottom closure panels of a container blank held in an open and upright position comprising:

a. a vertically reciprocating mandrel having lower bending edges;

b. means for reciprocating the mandrel to insert the mandrel downwardly into the open container blank and to bring the bending edges of the mandrel adjacent the fold lines of the bottom closure panels;

c. a pair of fingers cooperating with the mandrel and acting one one of the pairs of panels to break inwardly the fold lines of both pairs of bottom closure panels;

d. a pair of roller bars acting on the pair of broken bottom closure flap panels to fold inwardly and upwardly both pairs of bottom closure panels; and e. a vertically reciprocating press plate to press the pairs of folded closure panels together against the mandrel and to seal them in place.